(12) United States Patent
Cypher et al.

(10) Patent No.: US 6,484,240 B1
(45) Date of Patent: Nov. 19, 2002

(54) MECHANISM FOR REORDERING TRANSACTIONS IN COMPUTER SYSTEMS WITH SNOOP-BASED CACHE CONSISTENCY PROTOCOLS

(75) Inventors: Robert Cypher, Saratoga, CA (US); Ricky C. Hetherington, Pleasanton, CA (US); Belliappa Kuttanna, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/365,159

(22) Filed: Jul. 30, 1999

(51) Int. Cl.[7] .............................................. G06F 12/00
(52) U.S. Cl. ........................ 711/141; 711/146; 712/216
(58) Field of Search ................................. 711/146, 147, 711/119, 122, 141; 712/219, 216

(56) References Cited

U.S. PATENT DOCUMENTS

| | | | |
|---|---|---|---|
| 5,432,918 A | | 7/1995 | Stamm |
| 5,652,859 A | | 7/1997 | Mulla et al. |
| 5,737,759 A | | 4/1998 | Merchant |
| 6,173,369 B1 | * | 1/2001 | Nguyen et al. ............. 711/140 |
| 6,189,088 B1 | * | 2/2001 | Gschwind ................... 712/216 |
| 6,253,291 B1 | * | 6/2001 | Pong et al. ................. 711/146 |
| 6,311,286 B1 | * | 10/2001 | Bertone ....................... 713/600 |

FOREIGN PATENT DOCUMENTS

| | | |
|---|---|---|
| EP | 0 801 349 | 10/1997 |
| WO | 99/41669 | 8/1999 |

OTHER PUBLICATIONS

Tanenbaum,. Computer Networks, Dec. 1989, Prentice-Hall, Inc., Second Edition, p. 89.*

* cited by examiner

Primary Examiner—Do Hyun Yoo
Assistant Examiner—Kimberly McLean
(74) Attorney, Agent, or Firm—B. Noël Kivlin (57) ABSTRACT

An apparatus and method for expediting the processing of requests in a multiprocessor shared memory system. In a multiprocessor shared memory system, requests can be processed in any order provided two rules are followed. First, no request that grants access rights to a processor can be processed before an older request that revokes access rights from the processor. Second, all requests that reference the same cache line are processed in the order in which they arrive. In this manner, requests can be processed out-of-order to allow cache-to-cache transfers to be accelerated. In particular, foreign requests that require a processor to provide data can be processed by that processor before older local requests that are awaiting data. In addition, newer local requests can be processed before older local requests. As a result, the apparatus and method described herein may advantageously increase performance in multiprocessor shared memory systems by reducing latencies associated with a cache consistency protocol.

22 Claims, 7 Drawing Sheets

MECHANISM FOR REORDERING TRANSACTIONS IN COMPUTER SYSTEMS WITH SNOOP-BASED CACHE CONSISTENCY PROTOCOLS

BACKGROUND OF THE INVENTION

1. Field of the Invention

This invention relates generally to the field of computer systems and, more particularly, to accelerating cache-to-cache transfers in computer systems with multiple processors.

2. Description of the Related Art

Data processing systems often include multiple processors that share a common system memory. As used herein, the term processor can be used to refer to an active device that uses a system memory. Processors can include microprocessors, input-output bridges, graphics devices, peripheral devices, or other devices that read or write to a system memory. Processors in data processing systems often include a cache to improve performance. Caches in a multiple processor system can include cache tags for each cache line. The cache tags can specify the access rights and ownership responsibilities for a corresponding processor.

Caches in a multiprocessor shared memory system need to be maintained in a consistent and coherent manner. A set of cache protocol rules can be employed to ensure that data stored in a system memory appears the same to all processors despite being stored in various caches. One approach to cache consistency is the use of a standard snooping protocol. In a standard snooping protocol, each processor broadcasts all of its requests for cache lines to all of the other processors on an address bus. Each processor, in turn, "snoops" the requests from other processors and responds, as needed, by updating its cache tags and/or conveying the data corresponding to the cache line to the other processor. In a standard snooping protocol, requests arrive at all processors in the same order, and each processor processes the requests in the order that they arrive. A processor can be said to 'process' a request when the request affects the internal state of the processor. In a standard snooping protocol, requests include local requests and foreign requests. Local requests include requests generated by the processor itself while foreign requests include requests from other processors. Requests can also be referred to as address packets since requests typically specify a cache line by its address. Address packets can also be referred to as address broadcasts. The terms request, address packet, and address broadcast will be used interchangeably herein.

The requirement that requests be processed in the order in which they arrive can be considered a performance drawback of a standard snooping protocol. In particular, this requirement can delay the transfer of data from one cache to another cache. The requirement can also delay the processing of data received by a processor if the data corresponds to a local request and it arrives before data that correspond to an earlier local request. In processing a local request, a processor waits for the data corresponding to the local request to arrive before processing other requests. Potentially, multiple processors can be waiting for a single processor to receive its data. This situation can create an undesirable latency in the system. If a processor is allowed to process other requests prior to the data corresponding to a local request arriving, however, starvation can result if a subsequent request revokes the processor's access rights to the cache line of the local request before the processor receives the data. A system for reducing the latency of a standard cache consistency protocol is needed without introducing starvation problems into the system.

SUMMARY

The problems outlined above are in large part solved by the use the apparatus and method described herein. Generally speaking, an apparatus and method for expediting the processing of requests in a multiprocessor shared memory system is provided. In a multiprocessor shared memory system, requests can be processed in any order provided two rules are followed. First, no request that grants access rights to a processor can be processed before an older request that revokes access rights from the processor. Second, all requests that reference the same cache line are processed in the order in which they arrive. In this manner, requests can be processed out-of-order to allow cache-to-cache transfers to be accelerated. In particular, foreign requests that require a processor to provide data can be processed by that processor before older local requests that are awaiting data. In addition, newer local requests can be processed before older local requests. As a result, the apparatus and method described herein may advantageously increase performance in multiprocessor shared memory systems by reducing latencies associated with a cache consistency protocol.

In one embodiment, a processor can include a first queue and a second queue to implement the above rules. The first and second queue can be operated in a first-in-first-out (FIFO) manner. The processor can store address packets that grant access rights to the processor in the first queue. The processor can also store in the first queue address packets that reference the same cache line as an address packet in the first queue. The processor can store all other address packets in the second queue. Address packets that require data can remain at the head of a queue until the data arrives. The processor can be configured to process address packets from the head of either queue in any order. In this manner, foreign packets that require data can be handled before older local packets that are awaiting data.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Figure 1:
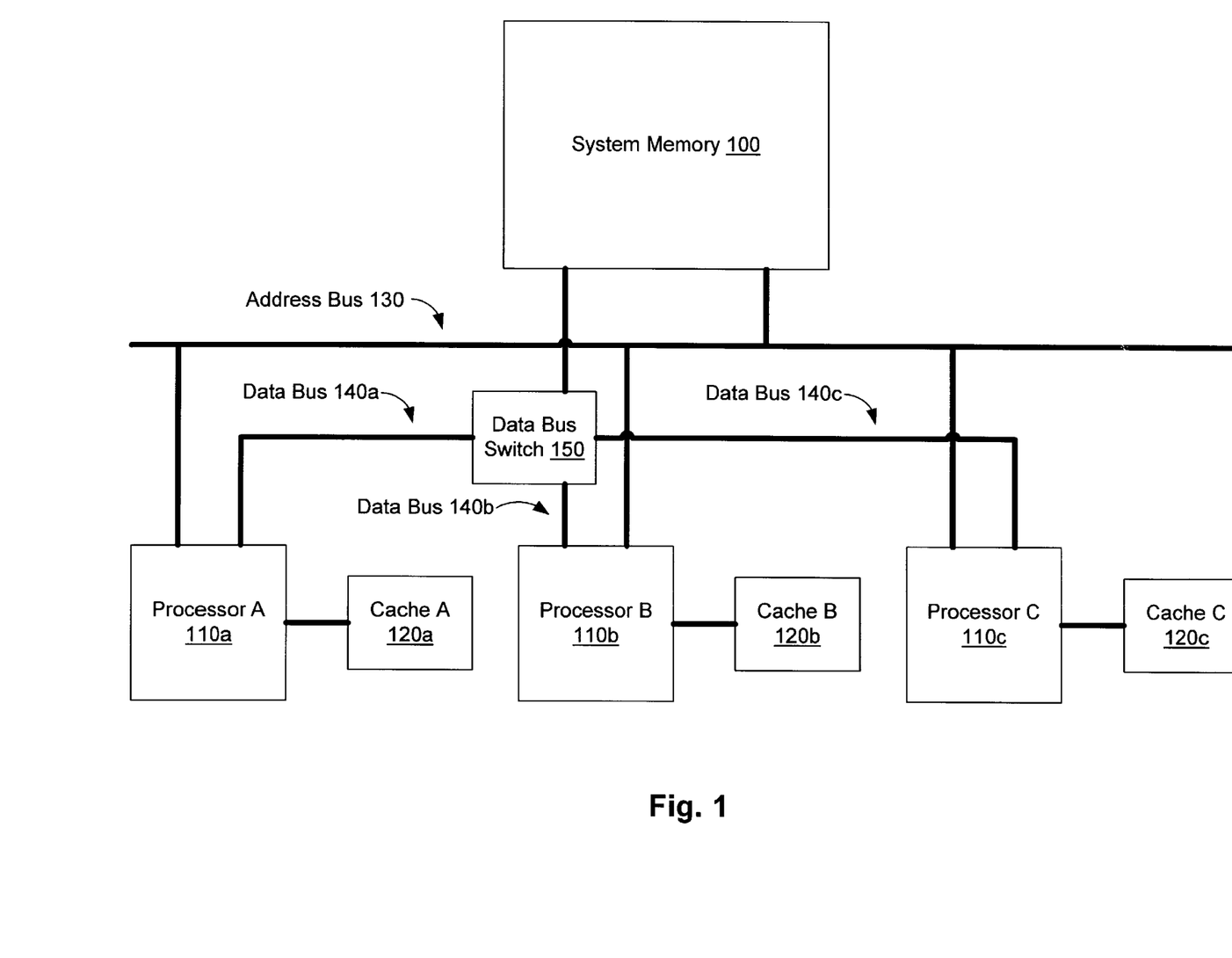
FIG. 1 is a block diagram illustrating one embodiment of a computer system.

Turning now to FIG. 1, a block diagram illustrating one embodiment of a computer system is shown. Other embodiments are possible and contemplated. In FIG. 1, system memory 100, processor A 110a, processor B 110b, processor C 110c, cache A 120a, cache B 120b, cache C 120c, address bus 130, data bus 140a, data bus 140b, data bus 140c, and data bus switch 150 are depicted. System memory 100 is coupled to address bus 130 and data bus switch 150. Processor A is coupled to address bus 130, data bus 140a, and cache A 120a. Processor B is coupled to address bus 130, data bus 140b, and cache B 120b. Processor C is coupled to address bus 130, data bus 140c, and cache C 120c.

In FIG. 1, processor A 110a, processor B 110b, and processor C 110c can be configured to access system memory 100 and store data retrieved from system memory 100 in cache A 120a, cache B 120b, and cache C 120c, respectively. As noted above, the term processor can be used to refer to an active device that uses a system memory. Processors can include microprocessors, input-output bridges, graphics devices, peripheral devices, or other devices that read or write to a system memory. Although FIG. 1 illustrates processor A 110a, processor B 110b, and processor C 110c, other processors can be added to the system and can be coupled to address bus 130 and data bus switch 150 in other manners. In the discussion of FIG. 1, FIG. 2, and FIG. 3, processor A 110a, processor B 110b, and processor C 110c can be referred individually as a 'processor' or collectively the 'processors'. Similarly, cache A 120a, cache B 120b, and cache C 120c can be referred individually as a 'cache' or collectively the 'caches'.

In one embodiment configured to employ a snoop-based cache consistency protocol, a processor can be configured to convey a request for data on address bus 130. As noted above, a request can also be referred to as an address packet or an address broadcast. Each processor can be configured to receive the requests of all of the other processors. In the embodiment of FIG. 1, address bus 130 can be said to comprise a broadcast network such that each request conveyed on address bus 130 can be received by each processor and system memory 100. A processor and system memory 100 can be configured to respond to a request based on a cache protocol employed by the system. A processor may respond to a request by altering its access rights and/or providing the data according to the cache protocol. If the cache protocol does not require a processor to provide data in response to a request, system memory 100 may be configured to provide the data. In FIG. 1, the processors and system memory 100 can be configured to provide the data by conveying it to data bus switch 150. Data bus switch 150, in response to receiving data from a processor or system memory, can be configured to route the data to the appropriate processor or system memory 100. In the embodiment of FIG. 1, data bus switch 150 and data buses 140a, 140b, and 140c can be said to comprise a point-to-point switched network.

In the embodiment of FIG. 1, requests can be configured to identify data to be obtained by using the address of the data in system memory 100. In response to receiving data, a processor can be configured to store the data in its cache. In one embodiment, data can be stored in a location in a cache according to its address. Caches can be configured to map data from an address into a particular cache line. As a result, the cache of each processor can be configured to map data to the same location in their respective caches. Thus, a request for data from a processor can also be said to be a request for a cache line and a processor can respond to a request according to the cache line in its cache that corresponds to the address of the request. It can be noted that cache lines can be configured as any suitable size of memory.

In one embodiment, the caches in FIG. 1 include cache tags for each cache line. The cache tags can be configured to indicate a processor's access right to the cache line. The access rights can be defined according to a cache protocol. A cache protocol can define what access rights a processor has to a cache line and whether the processor is to provide the cache line in response to a request. In one embodiment, access rights can include a shared state, an exclusive state, and an invalid state. Generally speaking, a processor can be said to have access rights to a cache line if its rights are in the shared or exclusive state. If a processor's access right is in the exclusive state, no other processor can read or write to the cache line. If a processor's access right is in the shared state, another processor may also have shared access such that it can read the cache line. If a processor's access right to a cache line is in the invalid state, it will need to gain an access right to the cache line before reading or writing the cache line.

In one particular embodiment, a MOSI cache protocol can be employed. In a MOSI cache protocol, a processor's access right to a cache line can be either modified, owned, shared, or invalid. In the modified state, a processor can read and write a cache line and can provide the data of the cache line in response to a request from another processor. In the owned state, a processor can read a cache line but cannot write to it. The processor can also provide the data of the cache line in response to a request from another processor in the owned state. In the shared state, a processor can read a cache line but cannot write to it and does not provide the cache line in response to a request from another processor. In the invalid state, a processor cannot read from or write to a cache line and must convey a request to gain access. If no processor has a cache line in an owned or modified state, system memory 100 can provide the cache line in response to a request. Other embodiments can be configured to implement other cache protocols.

As noted above, a standard snooping protocol generally requires processors to process requests in the order they are received. A processor can be said to 'process' a request when the request affects the internal state of the processor. In the protocol employed by the system in FIG. 1, however, requests can be processed in any order provided the following two rules are obeyed. First, no request that grants access rights to a processor can be processed by that processor before an older request that revokes access rights from the processor. Second, all requests that reference the same cache line are processed by a processor in the order in which they arrive at the processor. In the above rules, the granting and revocation of access rights can be viewed from the processor that processes a request. Certain requests, for example, may grant access rights to one processor while revoking rights from another. The rules, however, are defined in terms of the effect of a request within the processor that processes the request.

It can be noted that the two rules can be applied to any cache protocol. For purposes of illustration, however, the rules will be described with respect to the MOSI cache protocol. As noted above, a processor can receive and process local and foreign requests. In the MOSI protocol, access rights can be granted or revoked based on the current state of the access rights of a cache line and the type of request. In particular, a local request for shared access to a cache line whose current state is invalid constitutes a grant of access rights. A local request for exclusive access to a cache line whose current state is invalid, shared, or owned also constitutes a grant of access rights. A foreign request for shared access to a cache line whose current state is modified constitutes a revocation of access rights. A foreign request for exclusive access to a cache line whose current state is modified, shared, or owned also constitutes a revocation of access rights.

It can be noted that some requests are neither grants nor revocations. Such requests include a foreign request for shared access to a cache line whose current state is shared, owned, or invalid. Other requests can be both a grant and a revocation. A local ReadStream packet, for example, can request a read-once copy of a cache line that is invalid. In this manner, a local ReadStream packet can grant an access right to read the cache line and can subsequently revoke that access right once the cache is read. Requests that neither grant nor revoke access rights and requests that both grant and revoke access rights can be handled in manner consistent with the above rules.

The use of the above rules can allow requests to be processed in an out-of-order manner and may provide performance advantages over other systems. For example, in the above rules, a request that revokes access rights can be processed prior to an older requests as long as the request does not reference the same cache line as the older request. Similarly, a request that grants access rights can be processed prior to an older request that also grants access rights as long as the request does not reference the same cache line as any of the older requests.

One particular advantage of the use of the rules over other systems involves cache to cache transfers. In the case where a processor has modified or owned access rights to a cache line, the processor can provide data corresponding to that cache line to satisfy a foreign request for shared or exclusive access. If the processor has a local request that was received prior to the foreign request, it may not have to wait for the data that would satisfy the local request to arrive before sending the data corresponding to the foreign request. In other words, the processor could send the data to satisfy the foreign request prior to receiving the data to satisfy the older local request. It can be noted, with respect to the above rules, that the local request would grant access rights to the processor and the foreign request would revoke access rights from the processor. Thus, cache to cache transfers can be expedited when a processor conveys data from its cache to another processor's cache prior to completing an older request. In this manner, the use of the rules can be said to accelerate cache to cache transfers of data.

Another advantage of the use of the above rules concerns the reordering of local requests. Under the rules, a processor can process a local request that grants access rights to the processor prior to an older local request that also grants access rights to the processor as long as the requests reference different cache lines. Thus, if the data for one local request arrives prior to the data for an older local request, the processor can process the newer request prior to processing the older request. In this manner, local requests can be processed in an expedited manner and may provide performance advantages over other systems.

The two examples just discussed are intended to highlight performance advantages of the use of the above rules in a multiprocessor shared memory system. Other performance advantages are possible and contemplated.

Figure 2:
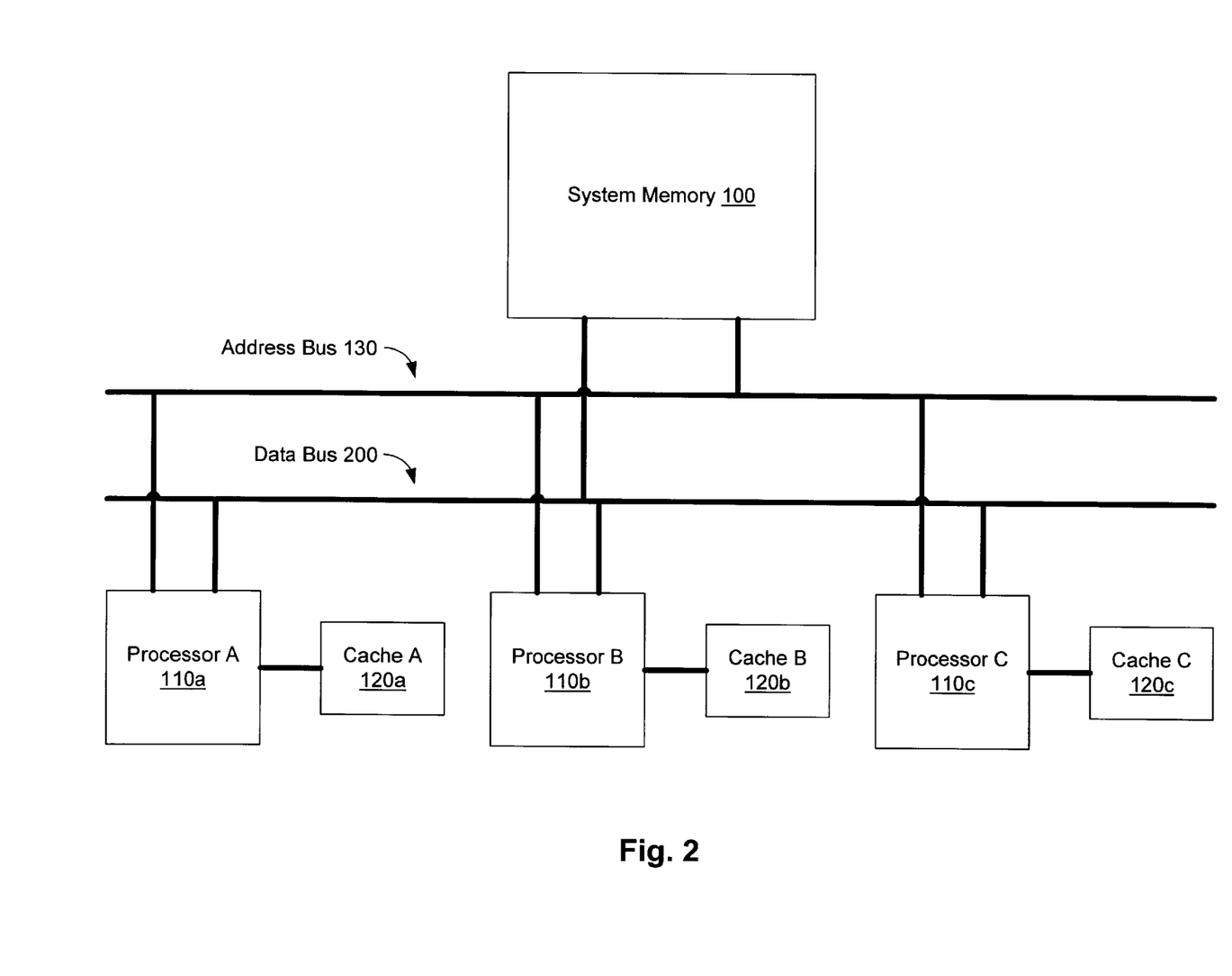
FIG. 2 is a block diagram illustrating one embodiment of a computer system.

Turning now to FIG. 2, a block diagram illustrating one embodiment of a computer system is shown. Other embodiments are possible and contemplated. In FIG. 2, system memory 100, processor A 110*a*, processor B 110*b*, processor C 110*c*, cache A 120*a*, cache B 120*b*, cache C 120*c*, address bus 130, and data bus 200 are depicted. System memory 100 is coupled to address bus 130 and data bus 200. Processor A is coupled to address bus 130, data bus 200, and cache A 120*a*. Processor B is coupled to address bus 130, data bus 200, and cache B 120*b*. Processor C is coupled to address bus 130, data bus 200, and cache C 120*c*.

In FIG. 2, processor A 110*a*, processor B 110*b*, and processor C 110*c* can be configured to access system memory 100 and store data retrieved from system memory 100 in cache A 120*a*, cache B 120*b*, and cache C 120*c*, respectively. Although FIG. 2 illustrates processor A 110*a*, processor B 110*b*, and processor C 110*c*, other processors can be added to the system and can be coupled to address bus 130 and data bus 200 in other manners.

The embodiment of FIG. 2 can be configured to employ the cache protocol rules as discussed above in FIG. 1. In FIG. 2, the processors and system memory 100 can be configured to provide data by conveying it on data bus 200. Data bus 200 can be said to comprise a broadcast network.

Figure 3:
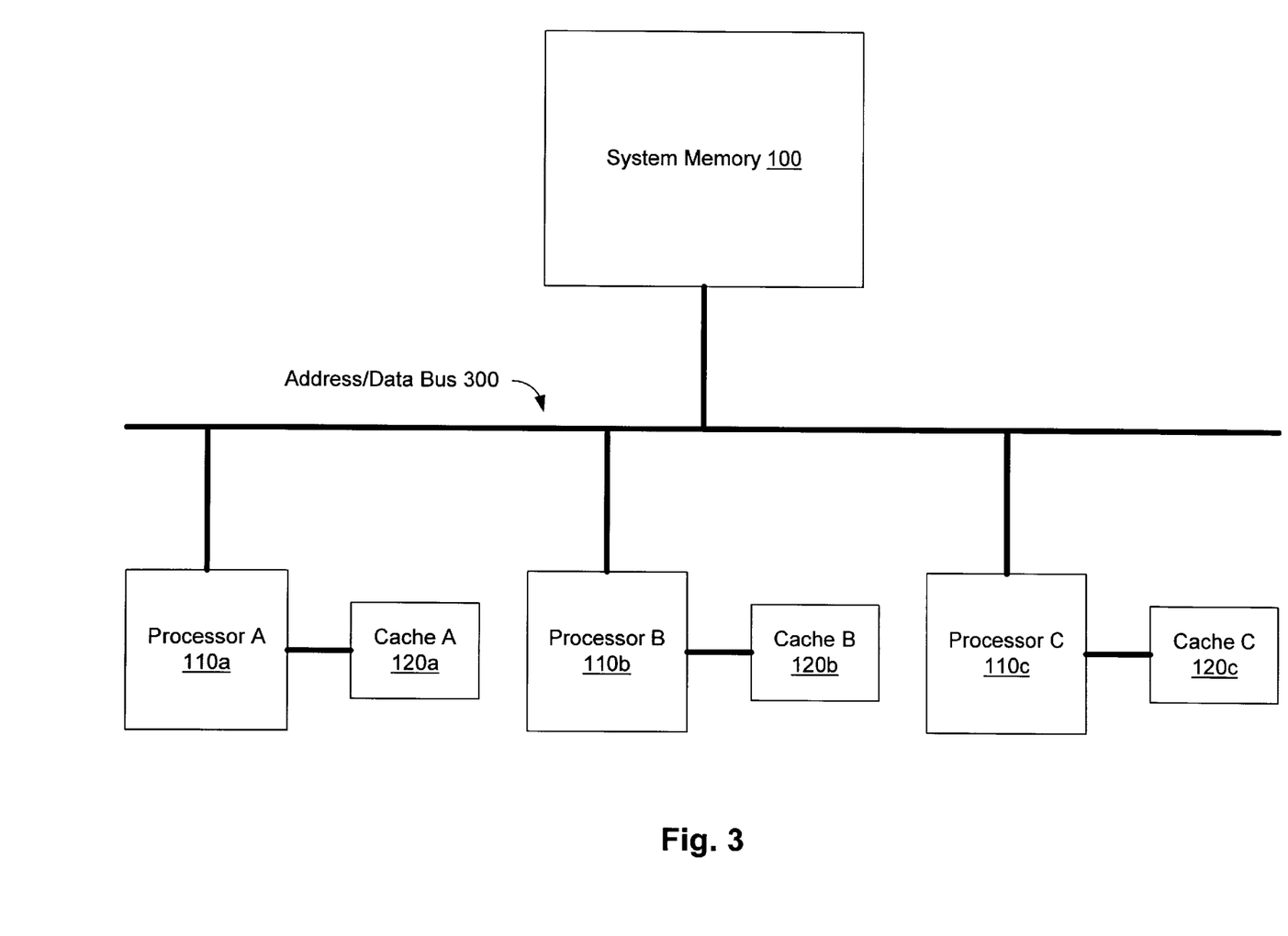
FIG. 3 is a block diagram illustrating one embodiment of a computer system.

Turning now to FIG. 3, a block diagram illustrating one embodiment of a computer system is shown. Other embodiments are possible and contemplated. In FIG. 3, system memory 100, processor A 110*a*, processor B 110*b*, processor C 110*c*, cache A 120*a*, cache B 120*b*, cache C 120*c*, and address/data bus 300 are depicted. System memory 100 is coupled to address/data bus 300. Processor A is coupled to address/data bus 300 and cache A 120*a*. Processor B is coupled to address/data bus 300 and cache B 120*b*. Processor C is coupled to address/data bus 300 and cache C 120*c*.

In FIG. 3, processor A 110*a*, processor B 110*b*, and processor C 110*c* can be configured to access system memory 100 and store data retrieved from system memory 100 in cache A 120*a*, cache B 120*b*, and cache C 120*c*, respectively. Although FIG. 3 illustrates processor A 110*a*, processor B 110*b*, and processor C 110*c*, other processors can be added to the system and can be coupled to address/data bus 300 in other manners.

The embodiment of FIG. 3 can be configured to employ the cache protocol rules as discussed above in FIG. 1. In FIG. 3, the processors and system memory 100 can be configured to provide data by conveying it on address/data bus 300. Address/data bus 300 can be said to comprise a shared broadcast network as it can be configured to transmit both requests, i.e. address packets and data.

Figure 4:
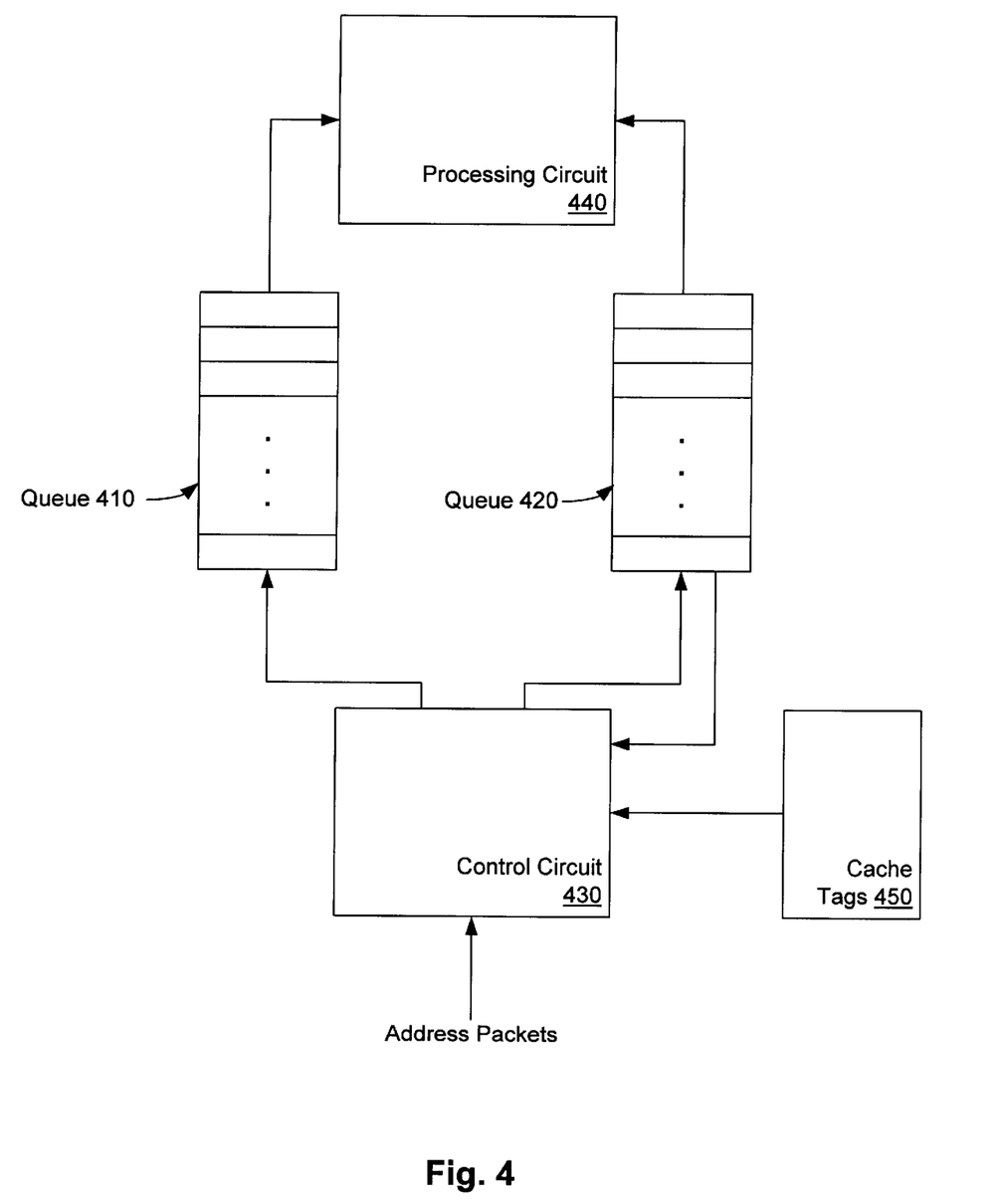
FIG. 4 is a block diagram illustrating one embodiment of an apparatus configured to process address packets in a computer system.

Turning now to FIG. 4, a block diagram illustrating one embodiment of an apparatus configured to process address packets in a computer system is shown. Other embodiments are possible and contemplated. In FIG. 4, queue 410, queue 420, control circuit 430, processing circuit 440, and cache tags 450 are depicted. Control circuit 430 is coupled to queue 410, queue 420, and cache tags 450. Processing circuit 440 is coupled to queue 410 and queue 420.

FIG. 4 illustrates one embodiment of an apparatus in a processor configured to use the cache protocol rules discussed above in FIG. 1. In FIG. 4, address packets, i.e.

requests, can be received by control circuit 430. Control circuit 430 can be configured to determine whether the address packets grant or revoke access rights to the processor. Control circuit 430 can also be configured to determine whether an address packet references the same cache line as an older address packet in the processor. Control circuit 430 can then be configured to store an address packet in queue 410 or queue 420. The address packet can be popped from either queue 410 or 420 and processed by processing circuit 440 consistent with the protocol rules described above.

In one embodiment, control circuit 430 can be configured to receive an address packet and determine whether that packet grants access rights to the processor. Control circuit 430 can be configured to receive the current access rights of the processor from cache tags 450. In one embodiment, cache tags 450 can be provided from a cache such as one of the caches shown in FIG. 1, FIG. 2, or FIG. 3. In other embodiments, cache tags 450 can be located within a processor. Control circuit 430 can be configured to compare the current access rights received from cache tags 450 with the type of request embodied in the address packet to determine whether the address packet grants an access right to the processor. It can be noted that address packets that both grant and revoke access rights, e.g. a local ReadStream packet, include a grant. Thus, control circuit 430 can be configured to determine that a ReadStream address packet grants access rights to the processor. If control circuit 430 determines that an address packet grants access rights to a processor, control circuit can be configured to convey the address packet to queue 420. Queue 420 can be configured to store the address packet.

Control circuit 430 can also be configured to determine whether an address packet references the same cache line as an address packet stored in queue 420. Control circuit 430 can be configured to compare the cache line referenced by an address packet with the cache lines referenced by address packets in queue 420. If control circuit 430 determines that an address packet references the same cache line as an address packet stored in queue 420, control circuit 430 can be configured to convey the address packet to queue 420 and queue 420 can be configured to store the address packet.

If control circuit 430 determines that an address packet does not grant access rights to the processor and the address packet does not reference the same cache line as an address packet stored in queue 420, control circuit 430 can be configured to convey the address packet to queue 410 and queue 410 can be configured to store the address packet. It can be noted that address packets that do not grant access rights to the processor can either revoke access rights or neither grant nor revoke access rights.

Processing circuit 440 can be configured to receive address packets from queue 410 and 420. In one embodiment, queue 410 and queue 420 are strictly first-in-first-out (FIFO) queues. In this embodiment, processing circuit 440 can be configured to receive and process the address packet from the head of queue 410 and queue 420. As can be seen, processing circuit 440 can receive address packets from the head of queue 410 and queue 420 in an order consistent with the protocol rules described in FIG. 1. In one embodiment, processing circuit 440 can be configured to attempt to receive an address packet from the head of queue 410 before attempting to receive an address packet from the head of queue 420. If queue 410 is empty or processing circuit 440 determines that the address packet at the head of queue 420 is older than the address packet at the head of queue 410, then processing circuit 440 can be configured to receive the address packet at the head of queue 420. In other embodiments, processing circuit 440 can be configured to determine whether to receive an address packet from queue 410 or queue 420 in other ways consistent with the protocol rules.

As described, queue 420 includes those address packets that grant access rights and those address packets that reference a same cache line as an earlier address packet are stored in queue 420. Queue 410 includes those address packets that do not grant access rights and that do not reference a same cache line as an earlier address packet are stored in queue 420. Since queue 410 and queue 420 are FIFO queues in this embodiment, an address packet that does not grant access rights but reference a same cache line as an earlier address packet in queue 420 will be processed subsequent to the earlier address packet. Thus, address packets can be popped and processed from the head of queue 410 and queue 420 consistent with the protocol rules. In particular, the address packets in queue 410 can be processed prior to older address packets in queue 420 without violating the protocol rules. In this manner, many foreign requests that require data from the processor can be processed before older local requests that are awaiting data since the foreign requests will be stored in queue 410 and the older local requests will be stored in queue 420. Consequently, the embodiment illustrated in FIG. 4 may advantageously accelerate cache to cache transfers as described above in FIG. 1.

In an alternative embodiment, queue 420 may not correspond to a FIFO queue. In this embodiment, address packets from queue 420 can be processed in any order as long as they are not processed before an earlier address packet in queue 410 and as long as they are not processed prior to an earlier address packet in either queue 410 or queue 420 that references the same cache line. In this embodiment, processing circuit 440 can be configured to enforce these conditions. As a result, processing circuit 440 can be configured to process an address packet from queue 420 prior to processing an older address packet from queue 420. In this manner, local requests that receive data can be processed before older local requests that are awaiting data. This embodiment may also advantageously accelerate cache to cache transfers as described above.

Figure 5:
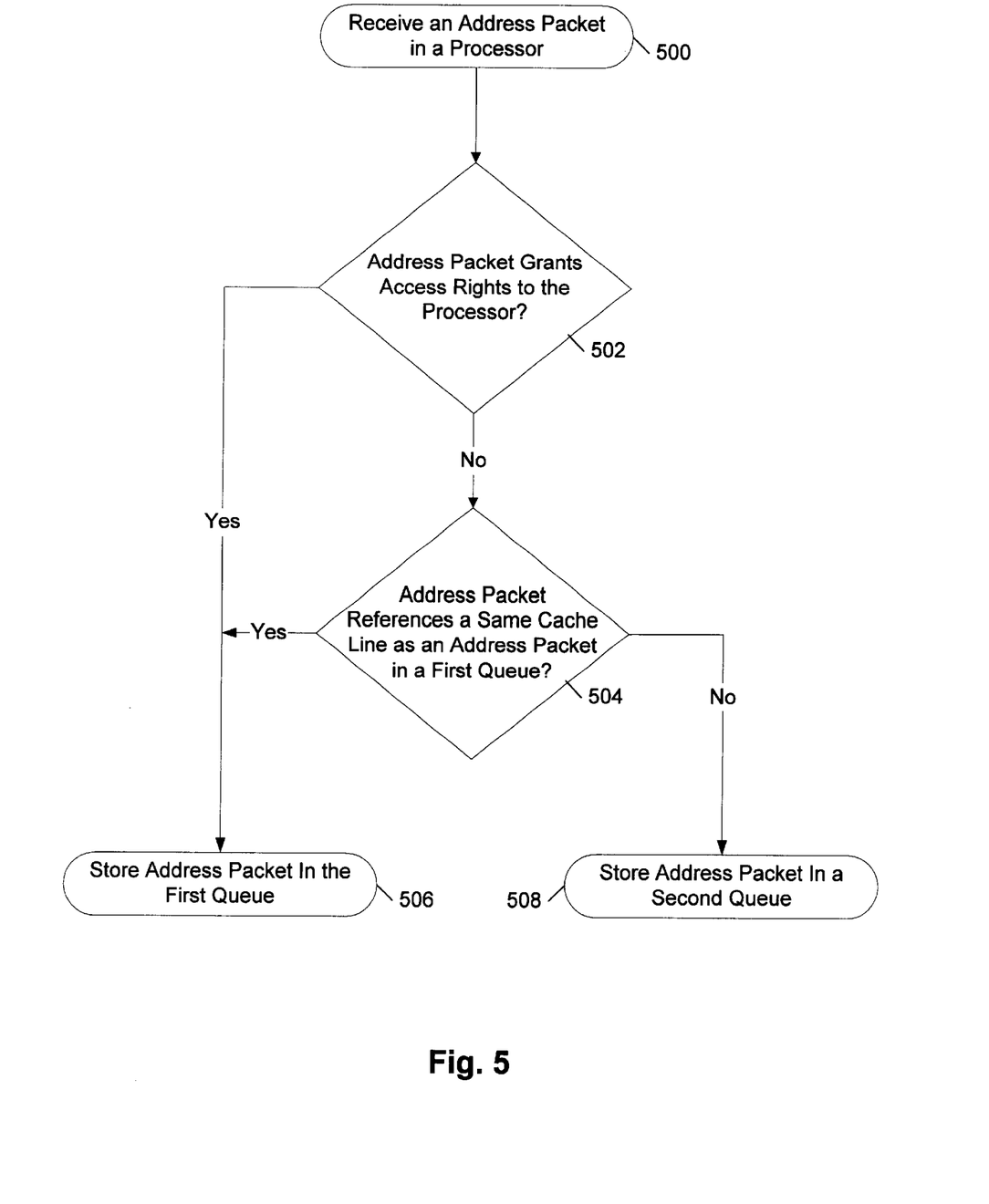
FIG. 5 is a chart depicting a method for handling address packets.

Turning now to FIG. 5, a chart depicting a method for handling address packets is shown. Variations on the method are possible and contemplated. The method includes receiving an address packet in a processor as indicated by block 500. In block 502, a determination can be made as to whether the address packet grants access rights to the processor. If the address packet grants access rights to the processor, the address packet can be stored in a first queue as indicated by block 506. If the address packet does not grant access rights to the processor, a determination can be made as to whether the address packet references a same cache line as an address packet in the first queue as indicated by block 504. If the address packet references a same cache line as an address packet in the first queue, the address packet can be stored in the first queue as indicated by block 506. If the address packet does not reference the same cache line as an address packet in the first queue, the address packet can be stored in a second queue as indicated by block 508.

Figure 6:
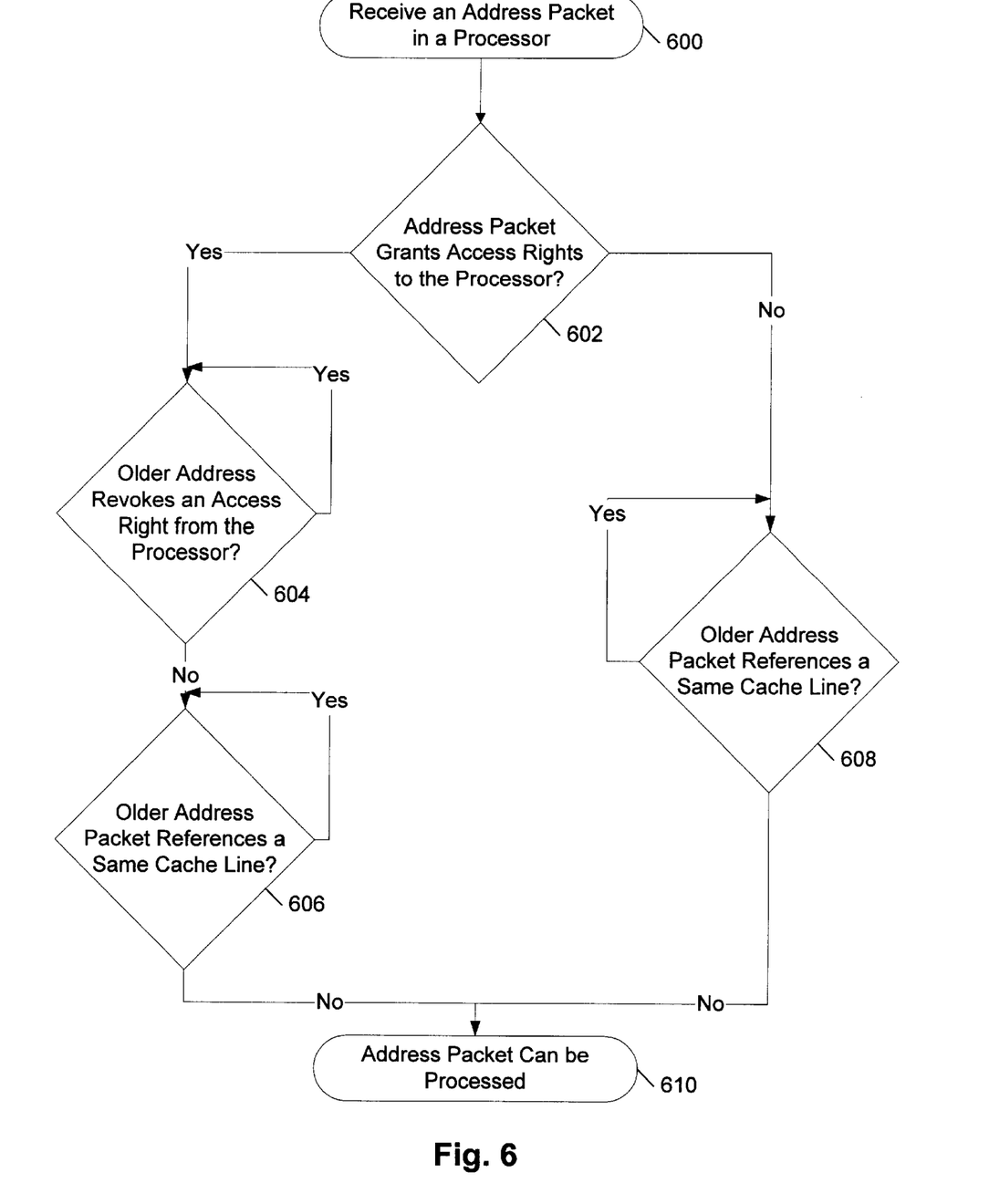
FIG. 6 is a chart depicting a method for determining if an address packet can be processed.

Turning now to FIG. 6, a chart depicting a method for determining if an address packet can be processed is shown. Variations on the method are possible and contemplated. The method includes receiving an address packet in a processor as indicated by block 600. In block 602, a determination can be made as to whether the address packet grants access rights to the processor. If the address packet grants access rights to the processor, a determination can be made as to whether an older address packet revokes an access right from the processor as indicated in block 604. The chart remains at block 604 until no older address packets remain that revoke an access right from the processor as indicated. If no older address packet revokes an access right from the processor, a determination can be made as to whether an older address packet references a same cache line as the address packet as indicated by block 606. The chart remains at block 606 until no older address packets remain that reference a same cache line as the address packet. If no older address packets remain that reference a same cache line as the address packet, the address packet can be processed as indicated by block 610.

If the address packet does not grant access rights to the processor, a determination can be made as to whether an older address packet references a same cache line as the address packet as indicated by block 608. The chart remains at block 608 until no older address packets remain that reference a same cache line as the address packet. If no older address packets remain that reference a same cache line as the address packet, the address packet can be processed as indicated by block 610.

FIG. 6 illustrates a method of processing address packets consistent with the protocol rules described in FIG. 1. Consequently, the method may be used to accelerate cache to cache transfers and expedite out-of-order processing of address packets in a multiprocessor shared memory computer system.

Figure 7:
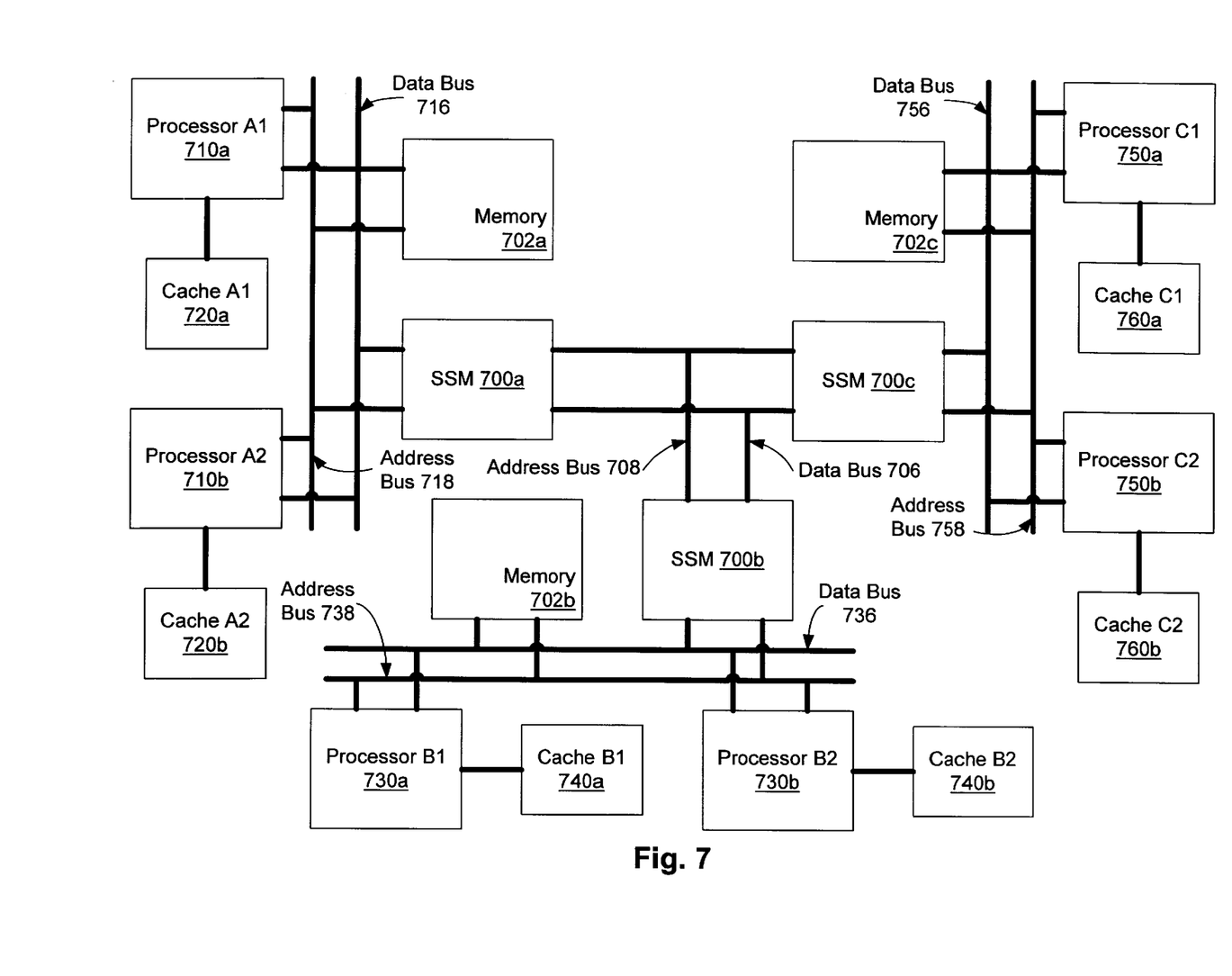
FIG. 7 is a block diagram illustrating one embodiment of a shared memory computer system with multiple nodes.

Turning now to FIG. 7, a block diagram illustrating one embodiment of a shared memory computer system with multiple nodes is shown. Other embodiments are possible and contemplated. FIG. 7 depicts memory 702*a*, memory 702*b*, memory 702*c*, scalable shared memory (SSM) 700*a*, SSM 700*b*, SSM 700*c*, processor A1 710*a*, cache A1 720*a*, processor A2 710*b*, cache A2 720*b*, processor B1 730*a*, cache B1 740*a*, processor B2 730b, cache B2 740*b*, processor C1 750*a*, cache C1 760*a*, processor C2 750*b*, and cache C2 760*b*. SSM 700*a*, SSM 700*b*, and SSM 700*c* are coupled to address bus 708 and data bus 706. Processor A1 710*a* and processor A2 710*b* are coupled to SSM 700*a* and memory 702*a* via address bus 718 and data bus 716. Processor B1 730*a* and processor B2 730*b* are coupled to SSM 700 and memory 702*b* via address bus 738 and data bus 736. Processor C1 750*a* and processor C2 750*b* are coupled to SSM 700*c* and memory 702*c* via address bus 758 and data bus 756. The various caches are coupled to the various processors as indicated in FIG. 7. In FIG. 7, memory 702*a*, processor A1 710*a*, cache A1 720*a*, processor A2 710*b*, cache A2 720*b*, and SSM 700*a* can be referred to as comprising node A. Memory 702*b*, processor B1 730*a*, cache B1 740*a*, processor B2 730*b*, cache B2 740*b*, and SSM 700*b* can be referred to as comprising node B. Memory 702*c*, processor C1 750*a*, cache C1 760*a*, processor C2 750*b*, cache C2 760*b*, and SSM 700*c* can be referred to as comprising node C.

FIG. 7 illustrates a multinode shared memory computer system. As shown, FIG. 7 includes node A, node B, and node C which each comprise multiple processors. Other embodiments can include other nodes with any number of processors. In addition, one or more nodes can be configured to include a point-to-point switch network or a shared broadcast network instead of the broadcast network address buses and data buses shown.

In the embodiment of FIG. 7, the processors can be configured to employ the cache protocol rules as discussed above in FIG. 1. As a result, requests can be processed in any order in the processors of FIG. 7 consistent with the protocol rules. In FIG. 7, the SSM's can be configured to receive requests from the processors in their respective nodes. An SSM can be configured to convey requests to other SSM's to fulfill requests from processors in its own node that cannot be satisfied by the other processors or memory in that node. An SSM can also be configured to convey requests to the processors and memory in its node in order to return data corresponding to a request from another SSM. In this manner, the advantages outlined above in FIG. 1 may be achieved both in the individual nodes and in the system as a whole.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. A processor comprising:
 a first storage device;
 a second storage device; and
 a control circuit coupled to said first storage device and said second storage device, wherein said control circuit is configured to:
  receive a first request;
  store said first request in said first storage device in response to detecting said first request is configured to grant an access right to said processor;
  store said first request in said first storage device in response to detecting said first request references a same cache line as a second request stored in said first storage device; and
  store said first request in said second storage device in response to detecting said first request is not configured to grant an access right to said processor and in further response to detecting said first request does not reference a same cache line as a second request stored in said first storage device.

2. The processor of claim 1, further comprising a processing circuit coupled to said first storage device and said second storage device, wherein said processing circuit is configured to process said first request prior to processing said second request in response to detecting said first request is stored in said second storage device.

3. The processor of claim 2, wherein said processing circuit is configured to process said first request prior to processing said second request in response to detecting said first request is stored in said first storage device and said first request does not reference a same cache line as a second request stored in said first storage device.

4. The processor of claim 2, wherein said second storage device includes a third request, and wherein said processing circuit is configured to process said first request prior to processing said third request in response to detecting said first request is stored in said second storage device and said first request does not reference a same cache line as said third request.

5. The processor of claim 4, wherein said processing circuit is configured to process said third request prior to processing said first request in response to said first request being stored in said first storage device.

6. The processor of claim 2, wherein said processor is configured to convey data to another processor in response to said first request.

7. The processor of claim 1, wherein said first and second storage devices comprise first-in-first-out queues.

8. The processor of claim 1, wherein said first and second requests comprise address packets.

9. The processor of claim 1, wherein said processor is coupled to a second processor via an address bus and a data bus, and wherein said processor is configured to convey a first request to said second processor via said address bus, and wherein said second processor is configured to receive a second request prior to receiving said first request, and wherein said second processor is configured to process said first request prior to said second request in response to detecting said first request references a different cache line from said second request and said second request is not configured to revoke an access right of said second processor.

10. The processor of claim 9, wherein said data bus comprises a point-to-point switched network.

11. The processor of claim 9, wherein said second processor is configured to process said first request prior to said second request in response to detecting said first request references said different cache line, said second request is configured to grant a second access right to said second processor, and said first request is configured to grant a third access right to said processor.

12. The processor of claim 9, wherein said second processor is configured to convey data on said data bus in response to processing said first request.

13. The processor of claim 9, wherein said second processor is configured to process said first request subsequent to said second request in response to detecting said first request references a same cache line as said second request.

14. The processor of claim 9, wherein said first processor and said second processor are configured to employ a MOSI cache-consistency protocol.

15. The processor of claim 9, wherein said second request is generated by said second processor.

16. A method comprising:
receiving a first request in a processor;
receiving a second request in a processor prior to said receiving said first request;
processing said first request prior to said second request in response to detecting:
(i) said second request is not configured to revoke a first access right of said processor;
(ii) said first request does not reference a same cache line as said second request;
(iii) said first request is configured to grant a second access right to said processor; and
(iv) said second request is configured to cause a third access right to be granted to said processor.

17. The method of claim 16, further comprising processing said first request subsequent to said second request in response to detecting said first request references said same cache line as said second request.

18. The method of claim 16, further comprising conveying data from said processor in response to processing said first request.

19. The method of claim 16, further comprising:
storing said first request in a first queue in response to detecting said first request is configured to grant a second access right to said processor;
storing said first request in said first queue in response to detecting said first request references said same cache line as said second request; and
storing said first request in a second queue in response to detecting said first request is not configured to grant said second access right to said processor and said first request does not reference said same cache line as said second request.

20. The method of claim 16, wherein said first and second requests comprise address packets.

21. A computer system comprising:
a first processor coupled to a first cache; and
a second processor coupled to a second cache;
wherein said first processor further comprises a control circuit coupled to a first storage device and a second storage device, wherein said control circuit is configured to:
receive a first request;
store said first request in said first storage device in response to detecting said first request is configured to grant an access right to said first processor;
store said first request in said first storage device in response to detecting said first request references a same cache line as a second request stored in said first storage device; and
store said first request in said second storage device in response to detecting said first request is not configured to grant an access right to said first processor and detecting said first request does not reference a same cache line as a second request stored in said first storage device.

22. A method comprising:
receiving a first request in a processor;
receiving a second request in a processor prior to said receiving said first request;
storing said first request in a first queue in response to detecting either:
said first request is configured to grant a second access right to said processor; or
said first request references said same cache line as said second request;
storing said first request in a second queue in response to detecting said first request is not configured to grant said second access right to said processor and said first request does not reference said same cache line as said second request; and
processing said first request prior to said second request in response to detecting:
said second request is not configured to revoke a first access right of said processor; and
said first request does not reference a same cache line as said second request.

* * * * *